Figure 1:
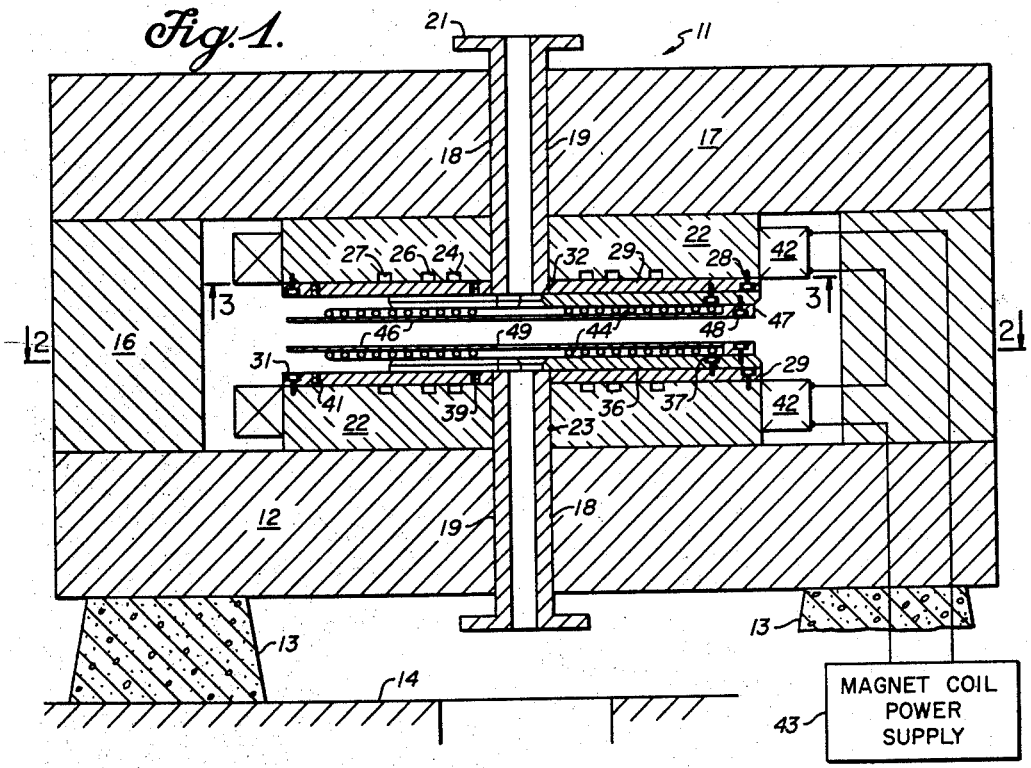

INVENTORS
RICHARD J. BURLEIGH
ELMER L. KELLY
JOSEPH H. DORST
CHARLES G. DOLS

ATTORNEY

March 23, 1965 R. J. BURLEIGH ETAL 3,175,131
MAGNET CONSTRUCTION FOR A VARIABLE ENERGY CYCLOTRON
Filed Feb. 8, 1961 2 Sheets-Sheet 2

INVENTORS
RICHARD J. BURLEIGH
ELMER L. KELLY
BY JOSEPH H. DORST
CHARLES G. DOLS

ATTORNEY

United States Patent Office 3,175,131
Patented Mar. 23, 1965

3,175,131
MAGNET CONSTRUCTION FOR A VARIABLE
ENERGY CYCLOTRON
Richard J. Burleigh, Elmer L. Kelly, Joseph H. Dorst, and
Charles G. Dols, all of Berkeley, Calif., assignors to the
United States of America as represented by the United
States Atomic Energy Commission
Filed Feb. 8, 1961, Ser. No. 87,980
10 Claims. (Cl. 317—158)

This invention relates to charge particle accelerators and more particularly to magnetic pole pieces for cyclotrons and like accelerators which poles will maintain a desired radial field gradient at any of various field intensities.

In a cyclotron a pair of spaced apart magnet poles are used to provide a field for holding particles in a curvilinear orbit. In order to successfully accelerate particles it is necessary to maintain a particular magnetic field shape inasmuch as the stability of circulating particles is determined, in part, by the degree of change of the field as measured along a radius thereof. The required field profile may vary in different accelerators from a flat or uniform field to a condition where the field intensity either rises or dips at the outer edge of the pole surface. A field which decreases with radius provides axial focussing of the particle beam but limits the energy which can be obtained without introducing frequency modulation and thereby severely restricts the total beam current. A radially increasing field is not subject to the latter limitation but is axially unstable. Accordingly virtually all early cyclotrons used the radially decreasing field configuration. It has been found however, that by introducing a periodic azimuthal variation in the field, axial stability may be forced and the radially increasing field may be utilized. Accordingly most recent cyclotrons employ the latter configuration. A cyclotron using the azimuthally varying field is disclosed, for example, in U.S. Patent No. 2,872,574, Cloverleaf Cyclotron, issued to E. M. McMillan et al., February 3, 1959.

Once a desired field profile has been selected, it must be maintained throughout operation of the accelerator since other parameters of the machine are fixed in relation to the field shape. In a cyclotron which is to operate at a single level of field intensity, maintenance of the profile is not a major problem once it has been established by suitable pole design, shimming, and trim coils. In a variable energy cyclotron however, a very serious problem occurs if the magnet is to be operated at different levels of energization. Specifically, the profile which exists at one level of magnet current may be seriously distored at another level. The effect arises principally from uneven saturation in different portions of the magnet and it will generally be found that the field near the center of the magnet increases out of proportion to the field near the rim. Additional local variations in relative field intensity may occur due to structural discontinuities in the poles such as axial bores for the insertion of the ion source.

The present invention provides a pole construction which has provision for adjusting the amount of iron at various points to aid in achieving a desired profile and which has further provision, in the form of internal annular void spaces, for minimizing saturation distortion, so that the magnet current may be varied without severe deviation from a selected field profile.

It is therefore an object of the invention to provide a pole construction for producing a magnetic field of the desired configuration in a variable energy cyclotron.

It is a further object of the present invention to provide a magnet pole structure for a variable energy level cyclotron which will maintain a selected field profile, within limits, at various levels of magnet energization.

It is still another object of the present invention to provide a cyclotron magnet which will produce a radially increasing magnetic field gradient in a variable energy cyclotron at any of a plurality of field strengths.

It is another object of this invention to provide a cyclotron magnet structure having means compensating for saturation effects whereby the field level may be varied without severe distortion.

It is a still further object of the invention to provide a cyclotron magnet having novel means for adjusting the magnetic field profile of the cyclotron.

It is an object of this invention to provide a convenient structure for adjusting the distribution of iron in the poles of a cyclotron magnet.

Figure 2:
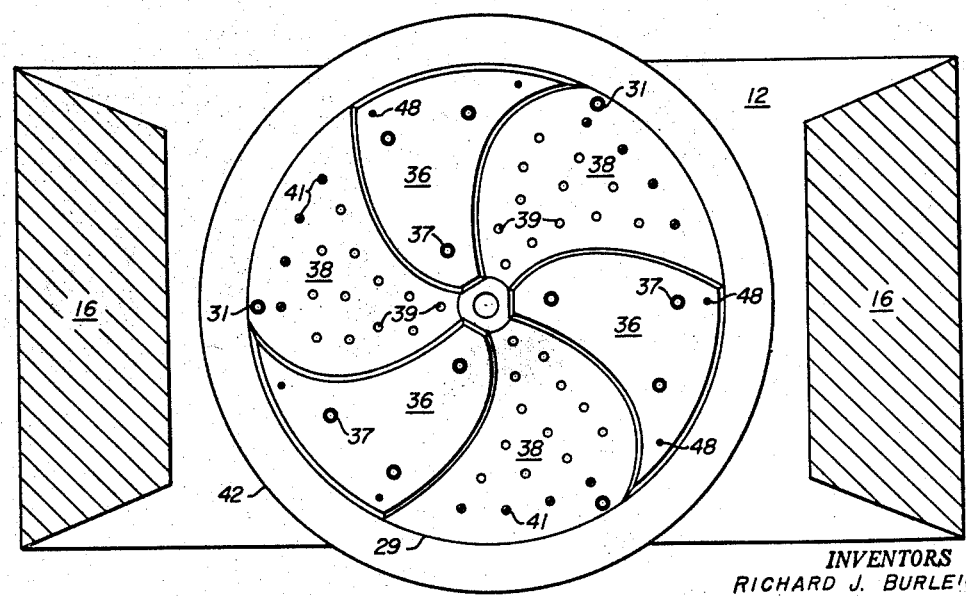
Figure 3:
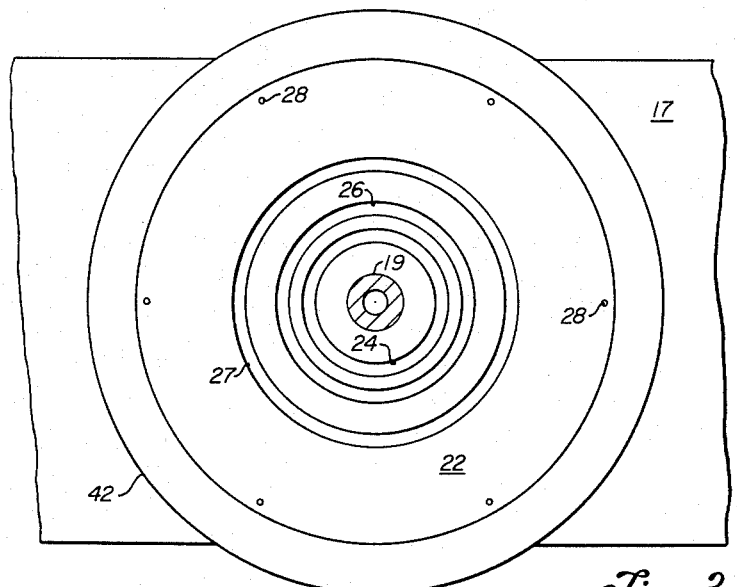
Figure 4:
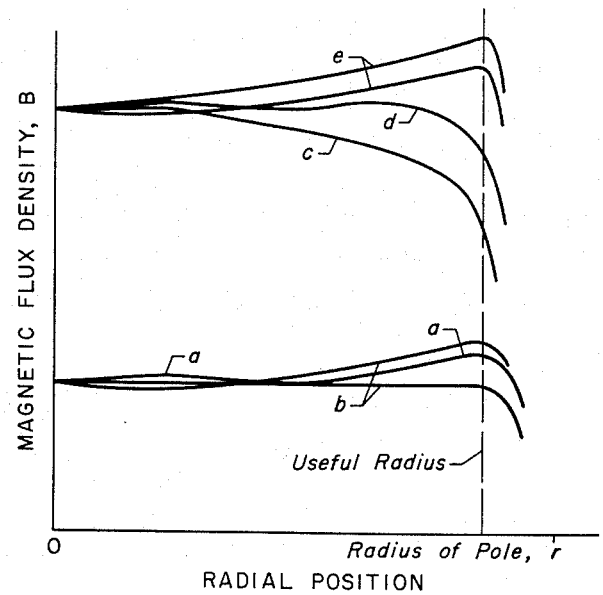

The invenion, together with further objects and advantages thereof, will be best understood by reference to the following specification in conjunction with the accompanying drawing, of which:

FIGURE 1 is an elevation section view of a cyclotron magnet taken through the center of the pole pieces and yoke thereof, FIGURE 2 is a plan section view taken along line 2—2 of FIGURE 1, FIGURE 3 is a section view taken along line 3—3 of FIGURE 1, and FIGURE 4 is a graphical illustration of typical magnetic field profiles in the cyclotron at two different levels of magnetization and showing the effect of the invention on the field.

Referring now to FIGURES 1 to 3 in conjunction, the magnet structure of a variable energy cyclotron embodying the present invention is shown at 11. For greater clarity, only the novel magnetic circuit of the cyclotron is shown in the drawing. The other elements of the accelerator, e.g. the ion source, R.F. oscillator, dee structure, vacuum equipment etc., may be of conventional design and suitable structure for these components is well known to those skilled in the art. Such means are disclosed, for example, in U.S. Patent No. 2,872,574, hereinbefore referred to.

The magnet in this embodiment is mounted on a yoke which is of massive iron construction and which has a rectangular frame shape. Thus the yoke includes a horizontal lower iron beam 12, which may be supported by a pair of concrete pillars 13 resting on a reinforced floor 14. At each of the two ends of lower yoke 12 is an upwardly extending iron leg 16. An upper yoke beam 17, similar to the lower beam 12, is mounted on top of the two legs 16 in a position directly above the lower beam 12 and parallel thereto. Both lower beam 12 and upper beam 17 are transpierced at the center by a vertical bore 18 and a hollow cylinderical liner 19 is disposed in the bore in each beam. The liners 19 provide for the insertion of an ion source into the cyclotron and the outer end of each liner is provided with a flange 21 for the purpose of making such connections as may be necessary to maintain the accelerator vacuum.

Two cylindrical iron pole pieces 22 are mounted within the yoke, one being secured to the lower surface of upper beam 17 and the other being secured to the upper surface of the lower beam 12. The two pole pieces 22 are coaxial and are spaced apart to define a magnet gap which gap constitutes the field region in which charged particles are to be accelerated. Each of the pole pieces 22 has an axial bore 23 which is a continuation of the bore 18 in the yoke beams and which allows the previously described liners 19 to extend through the pole piece.

Considering now an important feature of the invention, it is characteristic of prior cyclotron magnets of this general type that the field at the center of the magnet gap increases more rapidly than the field near the circumference as the energization of the magnet is increased. The effect results largely from differences in saturation between the two regions of the pole pieces. As a consequence of this effect, the field may have a desired radial gradient at a low level of magnet energization but if the field strength is raised to obtain higher energy particles, the gradient increases to a value which will not maintain a stable particle orbit.

The foregoing effect is counteracted in the present invention by forming internal void spaces within the poles near the axis thereof so that the concentration of iron in the poles is greater at the circumferential region thereof. Such voids have relatively little effect at low levels of magnet energization but act to reduce the relative amount of flux at the center of the field when the magnet energization is increased. This effect of the voids will be hereinafter discussed in greater detail.

To form voids, the facing surfaces of each pole piece 22 have concentric annular grooves 24, 26 and 27 which are coaxial with the pole pieces. The grooves 24, 26 and 27 are of progressively increasing diameter and are confined to the more central portions of the pole faces.

The face of each pole piece 22 is provided with a plurality of tapped holes 28 around the margin for the purpose of securing thereto a pair of thin disc shaped pole tips 29 of which one is disposed against each pole piece 22 in coaxial relationship thereon. The diameter of each pole tip 29 is the same as the diameter of the pole piece 22 to which it is attached. Each pole tip 29 is provided with countersunk bolt holes 31 for the purpose of securing the pole tip to pole piece 22 and therefore the holes 31 are aligned with the tapped holes 28. The countersinking is provided so that the bolt heads will not project from the pole tip surfaces when pole tips 29 are bolted in place. Each pole tip 29 is also provided with an axial bore 32 to receive the end of the hereinbefore described liner 19.

The particular magnet herein described is for a cyclotron of the spiral ridge alternating gradient type and, accordingly, three flat iron pieces 36 are secured to the exposed face of each pole tip 29. The flat iron pieces 36 are each shaped like a spiral sector of a circle and are spaced equiangularly around the center of the pole tips 29 with the apices innermost. The flat pieces 36 are beveled on all edges and are provided with countersunk holes 37 to permit bolting to the pole tips 29. The hill pieces 36 provided for the lower pole tip are shaped and arranged to form a mirror image of the pieces on the upper pole tip. The pieces 36 attached to the pole tips 29 form what are termed hills leaving valleys 38 at the exposed areas of the pole tips between adjacent pairs of hills. When the upper pole tip is mounted over the lower pole tip the hills of the upper pole tip line up with and are immediately over the hills of the lower pole tips. The necessary shapes and placement of the hill pieces 36 are well understood within the art and provide for focussing of an ion beam within a radially increasing magnetic field.

If the field strength is measured around any circle centered on the axis of the magnet, it will be found to vary with azimuth owing to the presence of the hill plates 36. Such measurement however will give an average field strength for that radius and if the average field strength is determined in a similar manner for circles of various radii a curve may be plotted with the radius from the magnet center as the abscissa and the average magnetic field strength at that radius as ordinate. This curve is the average radial field profile.

As hereinbefore discussed, a cyclotron is designed to operate with a specific pre-determined field profile. In practice the field initially provided by the magnet will virtually always be found to deviate somewhat from the planned profile and empirical adjustments are required to correct such deviation. Heretofore it has been the practice to make these adjustments by the addition of iron shims and by applying appropriate currents to trimming coils mounted on the pole faces.

The present invention provides a much more convenient means for making at least a portion of the required adjustment. Specifically, the valley areas 38 of the pole tips 29 are provided with a plurality of tapped holes 39 into which threaded iron studs 41 may be inserted, the holes being uniformly distributed on the valley areas. Only a few of the holes 39 are indicated on the drawing, however for maximum effectiveness holes 39 should be quite closely spaced over the area of valleys 38. The effective magnet gap will average longer where no studs 41 are installed thus keeping the field low in that area or the gap may be effectively reduced by installing studs in an area, thus increasing the field in that particular area. By means of such holes 39 and studs 41, the field may be initially adjusted to obtain a desired field intensity distribution. For instance the strength of the field near the center of the pole tip may be increased relative to outer areas of the pole tip by placing iron studs 41 in those holes 39 which are located near the center of pole tip 29 and leaving the other holes empty. By filling only the holes near the outer edge of the pole tip the outer portion of the field may be built up. In this manner it is evident that a limited adjustment of the average magnetic field contour may be made. It will be understood that the adjustment to be made on any given magnet is peculiar to that specific embodiment and may be determined by comparing the measured field profile with the desired profile.

Energization of the magnet is provided by means of a pair of coils 42 one being disposed coaxially around each pole piece 22. Each coil 42 is connected to a power supply 43 which supply is of the variable type to provide for changing the field strength of the cyclotron to accelerate ions to different energies.

Final adjustment of the magnetic field configuration may be made by means of conventional trimming coils which comprise several coil units each consisting of one or more turns of water cooled insulated conductors 44 secured to circular plates 46. Plates 46 in turn are mounted one on each pole tip 29 by means of stand-off members 47 and countersunk bolts 48. A central opening 49 in each of the plates 46 provides a passage for inserting the ion source to the center of the gap. The use of trimming coils for field adjustment, as well as the detailed design thereof, is well understood within the art.

Considering now the advantageous effect of the annular voids formed in the magnetic pole structure by the grooves 24, 26 and 27, FIGURE 4 indicates typical field profiles for low intensity magnetic fields and for high intensity magnetic fields in both the present invention and in a conventional cyclotron magnet. The curve $a$ is a typical profile at a low magnetic field intensity, without energization of the trimming coils, and represents a field which increases slightly at the outer end of the tion. The curve $a$ may be modified, by means of the field strength "$a$" is practically the same with or without the voids in the pole pieces and is thus typical of a conventional cyclotron magnet as well as the present invention. The curve $d$ may be modified, by means of the trimming coils, to the family of curves $b$ which may be the desired field profiles for accelerating different types of ions to a moderate energy.

In a variable energy cyclotron however, it is necessary that the general level of field strength be increased considerably on the occasions when high energy acceleration is to be accomplished. This is effected by supplying a greater current to the magnet coils. Curve $c$ illustrates the resultant distortion of the field profile where no voids are used, i.e. such curve indicates the profile in a conventional cyclotron magnet if the field were to be raised above the normal operation level. The field represented by curve $c$ has become too severely sloped to provide a stable particle orbit.

Curve $d$ indicates the radial profile for the same field level as curve *c* excepting the voids have been provided in the poles as taught by the present invention. The considerably flatter profile indicated by curve *d*, as compared to curve *c*, may be modified by means of the trimming coils to obtain the family of curves *e* which represent field profiles suitable for accelerating the various particles to high energy. Trimming coils alone cannot conveniently be used to produce the desired corrections in a field as sloped as that illustrated by curve *c*. Thus the invention provides for use of a single cyclotron for accelerating ions to widely differing energies.

While the invention has been disclosed with respect to a single embodiment, it will be apparent to those skilled in the art that numerous variations and modifications may be made within the spirit and scope of the invention and it is not intended to limit the invention except as defined in the following claims.

What is claimed is:

1. In a magnet for a variable energy cyclotron, the combination comprising a pair of coaxial cylindrical pole pieces spaced apart to form a magnetic field gap, each of said pole pieces having closed internal void spaces therein in proximity to said gap, said pole pieces being formed of a plurality of juxtaposed members having adjacent surfaces at least one of which is indented to form said closed internal void spaces.

2. In a magnet for a variable energy cyclotron, the combination comprising a pair of coaxial cylindrical ferromagnetic pole pieces spaced apart to form a magnetic field gap, each of said pole pieces having closed internal void spaces therein in proximity to said gap, each of said pole pieces being formed of a plurality of juxtaposed members adjacent surfaces of which enclose said internal void spaces, and an electrical coil for energizing said pole pieces to a plurality of field levels.

3. In a magnet for a variable energy cyclotron, the combination comprising a pair of coaxial cylindrical ferromagnetic pole pieces spaced apart to form a magnetic field gap, each of said pole pieces having internal void spaces therein in proximity to said gap, said void spaces having a greater total volume in the more axial regions of said pole pieces than in the circumferential regions thereof, and an electrical coil for energizing said pole pieces to a plurality of field levels.

4. In a magnet for a variable energy cyclotron, the combination comprising a pair of cylindrical pole pieces coaxially disposed in spaced apart relationship to form a magnetic field gap, each of said pole pieces having closed internal annular void spaces which are coaxial with said pole pieces, each of said pole pieces being formed of a plurality of juxtaposed members having adjacent surfaces which define said closed annular void spaces.

5. In a magnet for a variable energy cyclotron, the combination comprising a pair of coaxial cylindrical pole pieces disposed in spaced apart relationship to form a magnetic field gap, each of said pole pieces having closed internal annular void spaces therein which are centered on the axis of said pole pieces and which are proximal to said gap, each of said pole pieces being formed of a plurality of juxtaposed coaxial cylindrical members with said annular grooves being formed in an internal surface of one of said members, and at least one electrical coil for energizing said pole pieces to a plurality of field levels.

6. In a magnet for a variable energy cyclotron, the combination comprising a pair of coaxial cylindrical pole members, each having a pole face surface which surfaces are spaced apart to form a magnetic field gap, each of said pole members having a plurality of void spaces distributed therein and opening at said pole face surfaces thereof and a plurality of ferromagnetic elements engageable in said void spaces for selectively adjusting the distribution of ferromagnetic material within said pole members.

7. In a magnet for a variable energy cyclotron, the combination comprising a pair of coaxial cylindrical iron pole members, each having a pole face surface which surfaces are spaced apart to form a magnetic field gap, said pole members having a plurality of threaded bores distributed on the pole face surfaces thereof and forming internal voids therein and a plurality of threaded studs selectively engageable in said voids to adjust the distribution of magnetic flux across said gap.

8. In a magnet for a variable energy cyclotron, the combination comprising a pair of coaxial cylindrical pole pieces spaced apart to form a magnetic field gap, a pair of thin circular magnetic pole tips each attached against a separate one of said pole pieces, each of said pole tips having a plurality of distributed transverse bores therein, and a plurality of ferromagnetic elements engageable in said bores for selectively varying the distribution of flux within said gap.

9. A magnet for a variable energy cyclotron comprising, in combination, a pair of cylindrical iron pole pieces disposed coaxially in spaced apart relationship to form a magnetic gap, the faces of each of said pole pieces having at least one annular groove therein which groove is coaxial with said pole pieces, a pair of thin circular pole tips one secured against each of said pole faces and each having a plurality of transverse bores distributed thereon, a plurality of iron elements selectively mountable in said bores, a pair of electrical coils each encircling one of said pole pieces, and a variable power supply coupled to said coils for energizing said magnet to a plurality of field levels.

10. A magnet for variable energy cyclotron comprising, in combination, a pair of coaxial cylindrical pole pieces spaced apart to form a magnet gap, the facing surfaces of said pole pieces each having a plurality of concentric annular grooves therein which grooves are centered on the axis of said pole pieces, a pair of flat circular pole tips each secured to one of said facing surfaces of said pole pieces and each having a plurality of threaded bores opening at said gap, a plurality of threaded studs selectively engageable in said bores, a pair of electrical coils each encircling one of said pole pieces, and a variable current power supply coupled to said coils for energizing said magnet to a plurality of field strength levels.

References Cited by the Examiner

UNITED STATES PATENTS

| | | | |
|---|---|---|---|
| 2,777,099 | 1/57 | Foss | 317—158 |
| 2,872,574 | 2/59 | McMillan et al. | 317—200 X |

FOREIGN PATENTS 1,152,327   2/58   France.
   (Corresponding U.S. 3,056,069, Sept. 25, 1962)

LARAMIE E. ASKIN, *Primary Examiner.*

SAMUEL BERNSTEIN, JOHN F. BURNS, *Examiners.*